US006643773B1

(12) United States Patent
Hardjono

(10) Patent No.: US 6,643,773 B1
(45) Date of Patent: Nov. 4, 2003

(54) APPARATUS AND METHOD FOR AUTHENTICATING MESSAGES IN A MULTICAST

(75) Inventor: Thomas Hardjono, Arlington, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/290,557

(22) Filed: Apr. 13, 1999

(51) Int. Cl.[7] .............................................. H04L 12/22
(52) U.S. Cl. ........................ 713/153; 713/163; 713/201
(58) Field of Search ................................. 713/153, 163, 713/200

(56) References Cited

U.S. PATENT DOCUMENTS

| | | | | | |
|---|---|---|---|---|---|
| 5,111,453 A | * | 5/1992 | Morrow | ........................ | 370/401 |
| 5,442,708 A | | 8/1995 | Adams, Jr. et al. | ............ | 380/49 |
| 5,455,865 A | * | 10/1995 | Perlman | ..................... | 713/153 |
| 5,748,736 A | * | 5/1998 | Mittra | ........................ | 713/163 |
| 6,195,751 B1 | * | 2/2001 | Caronni et al. | ............. | 713/163 |
| 6,202,081 B1 | * | 3/2001 | Naudus | ....................... | 709/200 |
| 6,307,837 B1 | * | 10/2001 | Ichikawa et al. | ........... | 370/230 |
| 6,308,207 B1 | * | 10/2001 | Tseng et al. | ................. | 709/224 |
| 6,314,464 B1 | * | 11/2001 | Murata et al. | ............... | 709/226 |
| 6,363,154 B1 | * | 3/2002 | Peyravian et al. | .......... | 380/283 |
| 6,389,027 B1 | * | 5/2002 | Lee et al. | .................... | 370/401 |

OTHER PUBLICATIONS

Canetti et al, "Multicast security: A Taxonomy and Some Efficient Constructions".Mar. 21–25, 1999;Infocom 99 Online;vol. 2, pp. 708–716.*

Jordan et al. "Secure Multicast Communications Using a Key Distribution Center" Proceedings of the IFIP TC6 International Conference on Information Networks and Data Communication Apr. 18–21, 1994, Amsterdam, North Holland, vol. Conf 5 pp. 367–380.

Canetti, R. et al. "Multicast Security: A Taxonomy and Some Efficient Constructions" Infocom '99 'Online! vol. 2, Mar. 21–25, 1999, pp. 708–716.

"Authenticating PIM Version 2 Messages," PIM Working Group, Wei, Liming, Cisco Systems Inc., Nov. 11, 1998.

* cited by examiner

Primary Examiner—Gilberto Barron
Assistant Examiner—Kambiz Zand
(74) Attorney, Agent, or Firm—Neil G. J. Mothew

(57) ABSTRACT

An apparatus and method, utilized by a receiving node in a multicast for authenticating a message received from a transmitting node, uses tags to determine if the transmitting node is in the multicast. More particularly, a first tag received with the message is located and utilized to determine if the transmitting node is in the multicast. The first tag includes data associated with at least one of the receiving node and the transmitting node. A second tag then is generated if the transmitting node is determined to be in themulticast. Once generated, the second tag is transmitted with the message to a third node in the multicast. Among other things, the second tag includes data indicating that the receiving node is in the multicast.

64 Claims, 2 Drawing Sheets

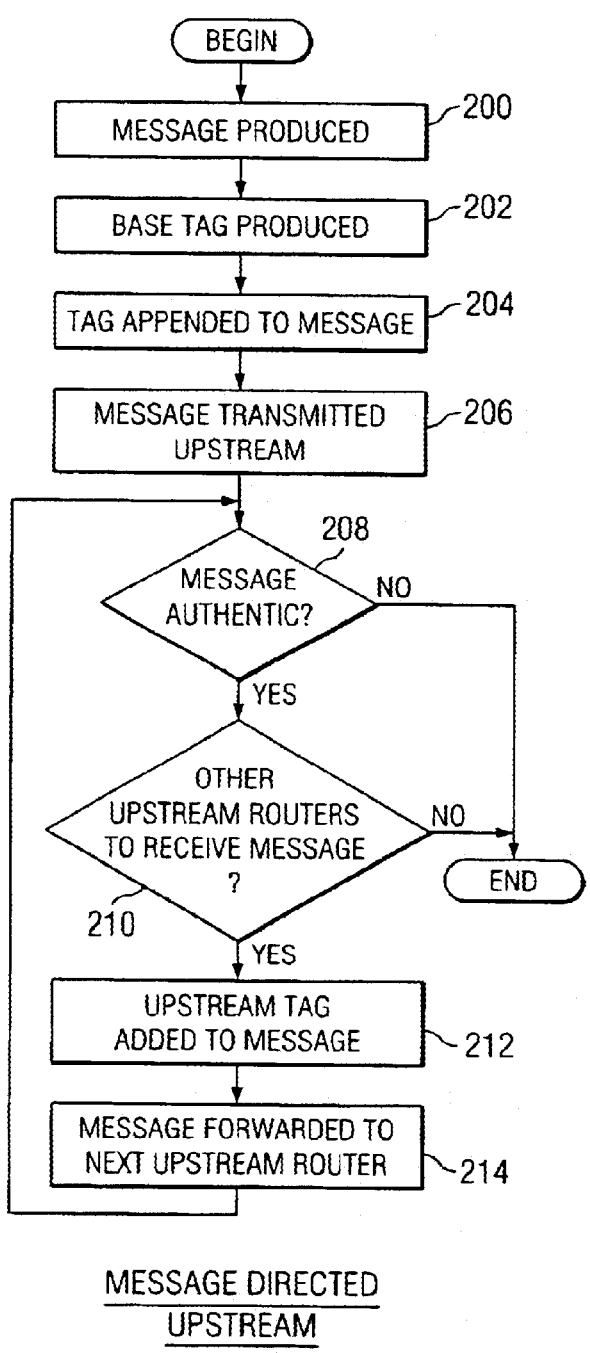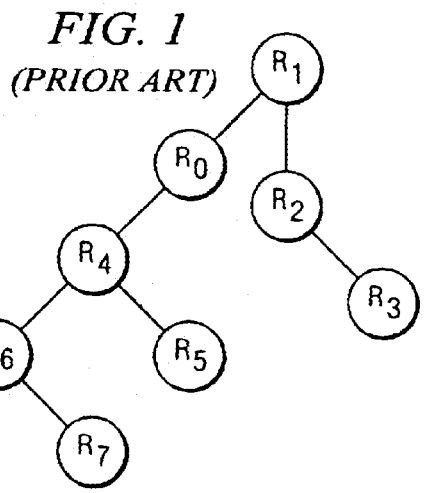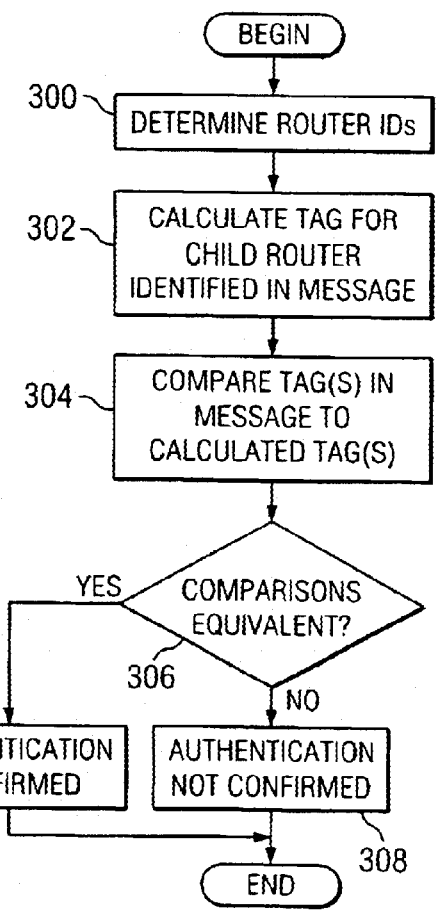

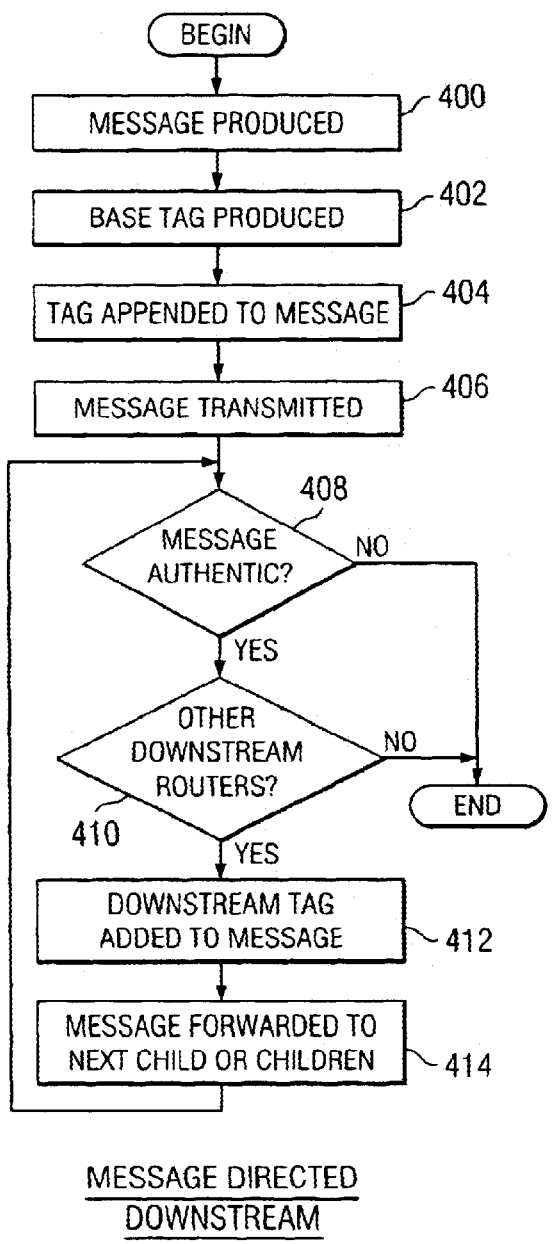
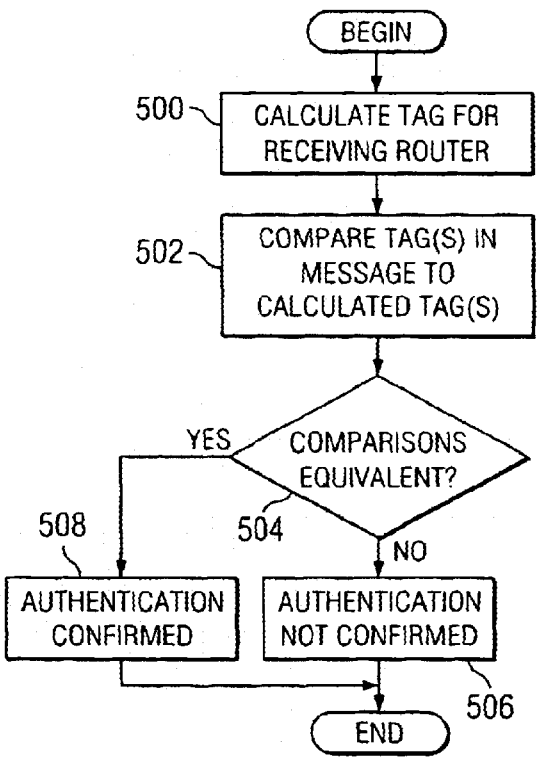

APPARATUS AND METHOD FOR AUTHENTICATING MESSAGES IN A MULTICAST

FIELD OF THE INVENTION

The invention generally relates networks and, more particularly, the invention relates to multicast transmissions across a computer network.

BACKGROUND OF THE INVENTION

Multicasting is a well known method of transmitting messages to selected groups of users across a network, such as the Internet. One simple example of multicasting entails transmitting an E-mail message to a plurality of users that each are on a mailing list. Video conferencing and teleconferencing also use multicasting principles and thus, often are referred to as "multiconferencing."

Problems arise, however, when an unauthorized network device transmits a message to a multicast session. For example, an unauthorized network device undesirably may transmit a message that prematurely ends a multicast session. Such a message can disrupt such a multicast session.

SUMMARY OF THE INVENTION

In accordance with one aspect of the invention, an apparatus and method, utilized by a receiving node in a multicast for authenticating a message received from a transmitting node, uses tags to determine if the transmitting node is in the multicast. More particularly, a first tag received with the message is located and utilized to determine if the transmitting node is in the multicast. The first tag includes data associated with at least one of the receiving node and the transmitting node. A second tag then is generated if the transmitting node is determined to be in the multicast. Once generated, the second tag is transmitted with the message to a third node in the multicast. Among other things, the second tag includes data indicating that the receiving node is in the multicast.

In preferred embodiments, at least one of the receiving node and the transmitting has an associated encryption key that is used to produce a generated first tag. The generated first tag then is compared with the located first tag to determine if the transmitting network is in the multicast. The second tag may be generated based upon either the receiving node key, or an encryption key of the third node in the multicast. In other embodiments, the message includes a plurality of tags that each are associated with one of a plurality of nodes in the multicast. The plurality of tags preferably are appended to the message.

In accord with other aspects of the invention, an apparatus and method utilized by a receiving node in a computer network for authenticating a message received from a transmitting node also utilizes tags. To that end, a first tag received with the message is located. The first tag includes information indicating if the transmitting node is in the multicast. The first tag then is utilized to determine if the transmitting node is in the multicast. A second tag is generated if the transmitting node is determined to be in the multicast. In preferred embodiments, the generated second tag includes information that the receiving node is in the multicast. The message and generated second tag then are transmitted to a third node in the multicast.

The tag may be appended to the message, or may be one of a plurality of tags appended to the message. Each of the plurality of appended tags preferably are associated with one of a plurality of tags in the multicast. In other embodiments, the tag is incorporated into the message. The receiving node may be any computer device, such as a router. The receiving node and transmitting node may each have respective encryption keys. The second tag maybe generated based upon either one of the encryption keys, depending upon the relation of the third node to the receiving node. The first tag may be utilized to determine if the transmitting node is in the multicast by ascertaining the first tag, and then comparing it to the located first tag. Specifically, the transmitting node may be determined to be in the multicast if the ascertained first tag is substantially identical to the located first tag. The first tag may be ascertained via memory, calculations, or other related method. For example, the first tag may be calculated from an encryption key associated with the receiving node. In other embodiments, the message is generated by an origin node having an origin tag. The receiving node may receive the origin tag, and the first tag and second tag may be calculated based upon the origin tag.

In accord with other aspects of the invention, a receiving node in a computer network with a multicast may be configured to authenticate a message received from a transmitting node in a manner similar to above noted aspects. More particularly, the receiving node may include an input that receives a first tag having information indicating whether the transmitting node is in the multicast, a multicast identifier that utilizes the first tag to determine if the transmitting node is in the multicast, a second tag generator that generates a second tag if the transmitting node is determined to be in the multicast, and an output that transmits the message and generated second tag to a third node in the multicast. The second tag includes information indicating that the receiving node is in the multicast.

In accord with yet other aspects of the invention, a network device for participating in a multicast in a computer network includes an input that receives message and tags from other network devices, a tag generator, an authenticator that reads tags associated with each message received from other network devices, and an output that transmits an authenticated message and a tag to a given network device. The authenticator determines if each received message is received from a network device in the multicast based upon the tag associated with each received message. Each received message is deemed to be authenticated if determined to be from a network device in the multicast. The tag is generated by the tag generator to include information indicating that the network device is in the multicast.

In preferred embodiments, a first message and associated first tag are received at the input from a first network device having a first encryption key. The authenticator then may utilized the first encryption key to produce a generated first tag. The authenticator then compares the generated first tag with the associated first tag received at the input to determine if the first network device is in the multicast. In other embodiments, the network device further includes an encryption key that the authenticator utilizes (instead of the encryption key of the first network device) to produce the generated first key.

Messages received without tags preferably are deemed to not be authenticated. In some embodiments, the given network device has an associated encryption key that is utilized by the tag generator to produce the transmitted tag. In other embodiments, the transmitted tag is generated based upon the encryption key of the network device.

In accord with other aspects of the invention, a method of filtering a message comprises receiving the message and identification tag from a first network device, determining if the first network device is in the multicast based upon the identification tag, and forwarding the message to a second network device in the multicast if the first network device is determined to be in the multicast. The identification tag preferably includes data identifying the multicast. In preferred embodiments, a second tag is forwarded with the message to the second network device if the first network device is determined to be in the multicast. The second tag includes data indicating the that message has been forwarded from at least one network device in the multicast. The tag may be generated based upon an encryption key.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein:

FIG. 1 schematically shows an exemplary multicast in which preferred embodiments of the invention may be implemented.

FIG. 2 shows a shows a preferred process of transmitting a multicast message in an upstream manner.

FIG. 3 shows a preferred process used by a parent router for authenticating messages received from a child router.

FIG. 4 shows a preferred process of transmitting multicast messages in a downstream manner.

FIG. 5 shows a preferred process used by a child router for authenticating messages received from a parent router.

DESCRIPTION OF PREFERRED EMBODIMENTS

In preferred embodiments, messages transmitted in a multicast are authenticated before being transmitted to another network device participating in the multicast. This ensures that network devices not participating in the multicast cannot generate and transmit messages within the multicast.

FIG. 1 schematically shows a plurality of routers in a computer network that are participating in a multicast. Each router has an input for receiving messages and authentication data, processing hardware and software for authenticating received messages, and an output for transmitting authenticated messages to other routers in the multicast. The routers may be any known router, such as one of the BAYSTACK ACCESS NODE™ family of routers, available from Bay Networks, Inc. of Santa Clara, Calif. Each router may be a local router for a local area network ("LAN") and thus, be coupled with a plurality of host computer systems (not shown). The multicast may be executing any conventionally known multicast protocol, such as IP Multicast, or the Protocol Independent Multicast protocol ("PIM protocol").

In preferred embodiments, a root router initiates the multicast by generating both the tree structure of the multicast, and multicast configuration parameters. In a source based tree, for example, the root node is known as a "source router,." while in a shared-tree structure, the root node is known as a "core" router. Among the multicast configuration parameters is a multicast identification parameter ("multicast ID"), which is a unique number assigned to the multicast that is distributed to and stored in local memory by routers in the multicast.

As known in the art, the tree structure has parent nodes and descendant nodes. In the multicast shown in FIG. 1, for example, router Ro is the parent node of routers R1 and R4 (i.e., routers R1 and R4 are the child nodes of parent router Ro). In a similar manner, router R1 is the parent node of router R2, while router R4 is the parent node of routers R5 and R6. In preferred embodiments, although one node can have multiple child nodes, no node can have more than one parent node. Multicast messages therefore are distributed on a per-hop basis via the parent/child nodes in the multicast.

The root router preferably is preconfigured with a symmetrical root router key ("root key") that, as discussed below, is utilized to generate keys for descendant routers. Moreover, since it initiated the tree structure, the root router includes data stored in local memory listing each descendant router participating in the multicast. For example, a unique identification string for each descendant router ("router ID number") may be stored. In a similar manner, each parent router includes a list in local memory of all of its descendant routers. For example, the router R1 includes local memory with a list of the router ID numbers of routers R2 and R3 as its descendant routers.

Upon initiating the multicast, a symmetrical shared multicast encryption key ("shared key") is distributed to each descendant router in the multicast. The key may be distributed in any secure manner, such as via a one-to-one secure channel, or in a manner similar to that disclosed in copending U.S. Provisional Patent Application entitled, "Key Dissemination in a Closed Multicast Environment" (serial No. 60/113,734, naming Thomas Hardjono as an inventor, having attorney docket number 2204/137, and filed Dec. 23, 1998), the disclosure of which is incorporated herein, in its entirety, by reference. As discussed below, the shared key also is utilized to generate tags that authenticate messages within the multicast (see FIG. 5).

Each parent/descendant pair preferably has a dedicated secure channel to transmit secure configuration data (e.g., encryption keys). Unlike such secure data, however, multicast messages are not distributed via the secure channels. Any conventionally known security technique that ensures the integrity of the secure channel may be utilized. One such protocol is the Internet Protocol security protocol ("IPsec"), which is a well known IETF (Internet Engineering Task Force) standard defining certain requirements for establishing a secure electronic channel with a session key. One known security method that is used by the IPsec protocol that may be utilized in preferred embodiments is known as the "Rivest, Shamir, and Adleman cryptography method" (RSA cryptography method).

One use of the secure channels is to distribute encryption keys from the parent routers to the child routers. More particularly, in addition to having a router ID number, each router has an associated encryption key that, among other uses, is used to generate the above noted authentication tags. In preferred embodiments, each parent generates a unique encryption key for each of its child routers, and then distributes them to each child router. For example, router Ro generates a key for router R1 and router R4. The R1 key is transmitted to router R1 via a secure channel, while the R4 key is distributed to router R4 via another secure channel. Upon receipt of their respective keys, each router stores its own key in local memory. Furthermore, each parent router stores the key of its child routers in local memory. Accordingly, child routers do not have access to the keys for peer routers and parent routers. Parent routers, however, have access to their own keys, as well as the keys for all of their descendant routers.

Encryption keys for each router may be generated in any manner. In preferred embodiments, however, each parent router calculates the key of a child router as a function of the multicast ID number, the router ID number of the child router, the router ID number of the parent router, and the encryption key of the parent router. Each of these parameters may be used as input into a one way hash function so that the key cannot be utilized to reproduce the function parameters. Of course, if not stored in local memory, a router can determine the key of any given descendant router (e.g., the child router of one of its child routers) by iteratively utilizing the hash function to calculate each lineally successive downstream child router between it and the given descendant router. As should be apparent to those skilled in the art, the key of each router in a multicast is generated as a function of the root key.

Messages in the multicast may be transmitted in either a downstream manner (i.e., away from the root router) or in an upstream manner (i.e., toward the root router). Details of each transmission manner arc discussed below.

In particular, FIG. 2 shows a preferred process of transmitting a multicast message in an upstream manner. The process begins at step 200 in which a message is produced by a downstream router (referred to as a "base router"). The message may include any data, such as a text document with accompanying graphical data. The process continues to step 202 in which a base tag (ajk/a "base digest") is produced that is to be appended to the message. The base router preferably generates the base tag as a function of the message data, base router ID number, and the base router encryption key. Among other methods, each of those parameters may be used as input into a selected keyed hash function to produce the base tag. After being generated, the base tag and origin ID number preferably are appended to the message (step 204), and then transmitted with the message to the upstream parent router of the base router (step 206).

Upon receipt by the parent router (a/k/a "receiving router"), the process continues to step 208 in which it is determined if the message was received from a router in the multicast (i.e., the message is authenticated). In summary, the tag is examined by the receiving parent router and determined to be authentic if the tag falls within specified examination guidelines. Details of the authentication process for upstream messages are discussed in detail below with respect to FIG. 3.

It the message is determined at step 208 not to be authentic, then the process ends. In addition to not being from a network device in the multicast, a message may not be authenticated if corrupted during transmission or upon receipt. The base router thus may have to re-send such a corrupted message. If not authentic, a network administrator may be notified of the unauthentic message and act accordingly. For example, an e-mail message may be transmitted to the network administrator advising them of such circumstance. In addition, a log file may be created that logs (records) each time a message is not authenticated. Many unauthenticated messages in a log file for a specific multicast can alert a network administrator to problems in the multicast that may be solved by reinitiating the multicast.

If it is determined at step 208 that the message is authentic, then the process continues to step 210 in which it is determined if other upstream routers are to receive the message. If no additional upstream routers are to receive the message, then the router receiving the message is the root router and thus, it may end the process. Depending upon the multicast protocol, the root process also may further distribute the message.

If, at step 210, it is determined that there are other upstream routers to receive the message, then the process continues to step 212 in which the receiving router generates and appends an upstream tag to the message/base tag combination. In addition, the router ID number of the receiving router also is appended to the message/base tag combination. In preferred embodiments, the upstream tag is a function of the message, receiving router ID number, base tag, and encryption key of the receiving router. As discussed below in FIG. 3, use of the receiving router encryption key enables it's parent to confirm that it in fact received the message from the receiving router. Each of these parameters may be used as input into a key hash function to produce the upstream tag. After the upstream tag and router ID number are appended to the message/base tag combination, the entire message combination is transmitted to the receiving router's parent router (step 214). The process then loops back to step 208 in which the message with appended tag(s) are authenticated.

The tag and router ID number of each router in the multicast that processes the message may be considered to be a single tag. In preferred embodiments, the tag/router ID number of each router in the multicast-that processes the message in the manner described above is appended to the message ("accumulative tag method"). Accordingly, the message/tag combination that is forwarded grows in size from router to router. The message/tag combination for a message processed by N routers and a base router thus may be arranged as follows:

message data/base router ID number, base tag/router ID number 1, upstream tag of router 1/router ID number 2, upstream tag of router 2/ . . . router ID number N, upstream tag of router N.

Upon receipt of such a message/tag combination, a receiving router can determine the exact path of the message. This information can be utilized to improve multicast performance, or to trouble-shoot problems.

In alternative embodiments, each receiving processor removes the tag and router ID data of the previous non-base router prior to appending its tag data to the message ("tag replacement method"). Accordingly, for example, a third receiving router may receive a message as follows:

message data/base router ID number, base tag/router ID number 2, upstream tag of router 2 and remove the previous tag from router 2 to produce a message as follows:

message data/base router ID number, base tag/router ID number 3, upstream tag of router 3

Use of the tag replacement method thus transmits less total data per message to each selected router. This method thus may be advantageous when available bandwidth in the network is limited.

It should be noted that although the accumulative tag method and tag replacement methods are discussed, the tag data may be transmitted to another node via other methods. For example, the tag may be transmitted after or before the message as an independent message, or the tag may be pre-penned to the front of the message. As a further example, the tag may be incorporated into the message.

As noted above, FIG. 3 shows a preferred process used by a parent router (at step 208) for authenticating messages received from a child router. The process begins at step 300 in which the router ID number of the child router to the receiving parent router is located in the tag. That child router's key then is calculated as described above, and then applied to the selected keyed hashing function to produce a calculated tag at step 302. Accordingly, the calculated tag is calculated in the same manner by the receiving parent router as it was calculated by the child router. In alternative embodiments, the tag may have been precalculated and stored in memory. The process thus continues to step 304 in which the calculated tag is compared to the tag appended with the message. If the message is transmitted via either one of the accumulative tag method or the tag replacement method, then the last tag is examined.

The process then continues to step 306 in which it is determined if the tag received with the message is equivalent to the calculated tag. In preferred embodiments, both the calculated tag and received tag are considered to be equivalent if they are the same value. Accordingly, if determined to be equivalent at step 306, then authentication is confirmed at step 310, thus confirming that the message was received from a network device in the multicast. If determined not to be equivalent at step 306, then authentication is not confirmed at step 308. The message therefore may have been corrupted, or received from a network device not in the multicast.

Messages are transmitted downstream in a manner that is similar to that used to transmit messages upstream (discussed above with regard to FIGS. 2 and 3). Details of transmitting messages downstream are discussed below with regard to FIGS. 4 and 5. Specifically, FIG. 4 shows a preferred method of transmitting a message downstream from a parent router to a descendant router. The process begins at step 400 in which a message is produced by a base router that also produces a base tag (step 402). Unlike the base router in FIG. 2, the base router calculates the base tag as a function of the group key, instead of a base key, since the child routers of the base router cannot determine the key of the base router. (i.e., as noted above, child routers do not have access to that data). In addition, the base router also calculates the base tag as a function of the message and base router ID number. Each of the parameters preferably are used as inputs to a selected hash function to produce the tag.

The process continues to step 404 in which the tag and base router ID number are appended to the message in any of the manners discussed above. Once the tag (and ID number, together referred to as the "tag") is appended, the message/tag combination are transmitted to the child router of the base router (the "receiving router", step 406). The receiving router then authenticates the message as described below with regard to FIG. 5 (step 408). If determined to be not authentic at step 408, the process ends and the log file and group administrator may be notified as described above. Conversely, if determined to be authentic at step 408, then the process continues to step 410 in which it is determined if other downstream descendant routers are to receive the message. The process ends if no other descendant routers are to receive the message.

If there are other downstream routers to receive the message, then the process continues to step 412 in which a downstream tag and router ID number of the receiving router's child router are added to the message by the receiving router. Unlike the upstream tag, however, the receiving router generates the downstream tag as a function of the key of the child router of the receiving router (i.e., the router to receive the message) and not the receiving router's key. Use of this key enables the receiving router's child router to authenticate the message since only its parent router (i.e., the receiving router) can ascertain its key. Accordingly, the receiving router must calculate it's child router's key prior to generating the tag. In addition, the downstream tag also is a function of the message, router ID number of the receiving router's child router (also unlike the previous method), and the base digest. Each of these parameters preferably is used as an input into a selected hash function. Once the tag is added to the message, then the tag/message combination are transmitted to the next child router (step 414). The process then loops back to step 408 in which the new receiving router authenticates the message.

FIG. 5 shows a preferred process utilized by any receiving router (at step 408) for authenticating a downstream message. The process begins at step 500 in which the receiving router (i.e., the child of the router that transmitted the message) calculates the tag by utilizing its own key as input into the selected keyed hash function, in addition to the message, its router ID number, and the base digest. This calculated tag then is compared to the tag received with the message (step 502). The process then continues to step 504 in which it is determined if the calculated tag and received tag are equivalent. If not equivalent, then the process continues to step 506 in which authentication is not confirmed. If determined to be equivalent, however, then the process continues to step 508 in which authentication is confirmed.

Preferred embodiments of the invention may be applied to many known multicast tree structures. For example, an intermediate router in a given multicast may be the base router and transmit the message both upstream and downstream. In both the upstream and downstream cases, the message may be transmitted to further routers and branch off, either or both upstream and downstream, when a new branch is reached. Principles of preferred embodiments thus may be utilized to ensure that messages are authenticated before being transmitted to other routers in the multicast.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method utilized by a receiving node in a computer network for authenticating a message received from a transmitting node in the computer network, the receiving node being one of a plurality of nodes in a multicast, the method comprising:

locating a first tag received with the message, the first tag including data associated with at least one of the receiving node and the transmitting node, the first tag generated by the transmitting node utilizing an encryption key known to the transmitting node;

utilizing the first tag to determine if the transmitting node is in the multicast by calculating a generated first tag utilizing the encryption key and comparing the generated first tag with the first tag to determine if the transmitting node is in the multicast;

generating a second tag if the transmitting node is determined to be in the multicast; and transmitting the message and generated second tag to a third node in the multicast, the second tag including data indicating that the receiving node is in the multicast.

2. The method as defined by claim 1 wherein the encryption key is associated with the receiving node.

3. The method as defined by claim 1 wherein the encryption key is associated with the transmitting node.

4. The method as defined by claim 1 wherein the receiving node has an associated encryption key, the second tag being generated based upon the encryption key.

5. The method as defined by claim 1 wherein the third node has an associated encryption key, the second tag being generated based upon the encryption key.

6. The method as defined by claim 1 wherein the message includes a plurality of tags, each tag being associated with one of a plurality of nodes in the multicast, the plurality of tags being appended to the message.

7. A receiving node in a computer network for authenticating a message received from a transmitting node in the computer network, the receiving node being one of a plurality of nodes in a multicast, the receiving node comprising:

a tag locator that locates a first tag received with the message, the first tag including data associated with at least one of the receiving node and the transmitting node, the first tag generated by the transmitting node utilizing an encryption key known to the transmitting node;

an authenticator that utilizes the first tag to determine if the transmitting node is in the multicast, the authenticator comprising, a tag regenerator that utilizes the encryption key to produce a generated first tag, and a comparator that compares the generated first tag with the first tag to determine if the transmitting node is in the multicast;

a tag generator that generates a second tag if the transmitting node is determined to be in the multicast; and an output that transmits the message and generated second tag to a third node in the multicast, the second tag including data indicating that the receiving node is in the multicast.

8. The receiving node as defined by claim 7 wherein the encryption key is associated with the receiving node.

9. The receiving node as defined by claim 7 wherein the encryption key is associated with the transmitting node.

10. The receiving node as defined by claim 7 having an associated encryption key, the second tag being generated based upon the encryption key.

11. The receiving node as defined by claim 7 wherein the third node has an associated encryption key, the second tag being generated based upon the encryption key.

12. The receiving node as defined by claim 7 wherein the message includes a plurality of tags, each tag being associated with one of a plurality of nodes in the multicast, the plurality of tags being appended to the message.

13. A computer program product for use with a receiving node in a computer network for authenticating a message received from a transmitting node in the computer network, the receiving node being one of a plurality of nodes in a multicast, the computer program product comprising a computer usable medium having computer readable program code thereon, the computer readable program code including:

program code for locating a first tag received with the message, the first tag including data associated with at least one of the receiving node and the transmitting node, the first tag generated by the transmitting node utilizing an encryption key known to the transmitting node;

program code for utilizing the first tag to determine if the transmitting node is in the multicast by calculating a generated first tag utilizing the encryption key and comparing the generated first tag with the first tag to determine if the transmitting node is in the multicast;

program code for generating a second tag if the transmitting node is determined to be in the multicast; and program code for transmitting the message and generated second tag to a third node in the multicast, the second tag including data indicating that the receiving node is in the multicast.

14. The computer program product as defined by claim 13 wherein the encryption key is associated with the receiving node.

15. The computer program product as defined by claim 13 wherein the encryption key is associated with the transmitting node.

16. The computer program product as defined by claim 13 wherein the receiving node has an associated encryption key, the second tag being generated based upon the encryption key.

17. The computer program product as defined by claim 13 wherein the third node has an associated encryption key, the second tag being generated based upon the encryption key.

18. The computer program product as defined by claim 13 wherein the message includes a plurality of tags, each tag being associated with one of a plurality of nodes in the multicast, the plurality of tags being appended to the message.

19. A method utilized by a receiving node in a computer network for authenticating a message received from a transmitting node in the computer network, the receiving node being one of a plurality of nodes in a multicast, the method comprising:

locating a first tag received with the message, the first tag including information indicating if the transmitting node is in the multicast, the first tag generated by the transmitting node utilizing an encryption key known to the transmitting node;

utilizing the first tag to determine if the transmitting node is in the multicast by calculating an ascertained first tag utilizing the encryption key and comparing the ascertained first tag with the first tag to determine if the transmitting node is in the multicast;

generating a second tag if the transmitting node is determined to be in the multicast; and transmitting the message and generated second tag to a third node in the multicast, the second tag including information indicating that the receiving node is in the multicast.

20. The method as defined by claim 19 wherein the first tag is appended to the message.

21. The method as defined by claim 19 wherein the message includes a plurality of tags, each tag associated with one of a plurality of nodes in the multicast, the plurality of tags being appended to the message.

22. The method of as defined by claim 19 wherein the first tag is incorporated into the message.

23. The method as defined by claim 19 wherein the receiving node is a network router.

24. The method as defined by claim 19 wherein the encryption key is associated with the receiving node, the second tag being generated based upon the encryption key.

25. The method as defined by claim 19 wherein the third node has an associated encryption key, the second tag being generated based upon the encryption key.

26. The method as defined by claim 19 wherein the encryption key is associated with the transmitting node.

27. The method as defined by claim 19 wherein the encryption key is associated with the receiving node.

28. The method as defined by claim 19 wherein the transmitting node is determined to be in the multicast if the ascertained first tag is substantially identical to the first tag.

29. The method as defined by claim 19 wherein the message is generated by an origin node having an origin tag, the receiving node receiving the origin tag, the first tag and second tag being calculated based upon the origin tag.

30. A receiving node, in a computer network, that authenticates a message received from a transmitting node in the computer network, the receiving node being one of a plurality of nodes in a multicast, the receiving node comprising:

an input that receives a first tag having information indicating whether the transmitting node is in the multicast, the first tag being received with the message, the first tag generated by the transmitting node utilizing an encryption key known to the transmitting node;

a multicast identifier that utilizes the first tag to determine if the transmitting node is in the multicast, the multicast identifier comprising,
means for ascertaining an ascertained first tag utilizing the encryption key, and
a comparator that compares the ascertained first tag to the first tag; and a second tag generator that generates second tag if the transmitting node is determined to be in the multicast; and an output that transmits the message and generated second tag to a third node in the multicast, the second tag including information indicating that the receiving node is in the multicast.

31. The receiving node is defined by claim 30 wherein the first tag is appended to the message.

32. The receiving node as defined by claim 30 wherein the message includes a plurality of tags, each tag being associated with one of a plurality of nodes in the multicast, the plurality of tags being appended to the message.

33. The receiving node as defined by claim 30 wherein the first tag is incorporated into the message.

34. The receiving node as defined by claim 30 wherein the receiving node is a network router.

35. The receiving node as defined by claim 30 wherein the encryption key is associated with the receiving node, the second tag being generated based upon the encryption key.

36. The receiving node as defined by claim 30 wherein the third node has an associated encryption key, the second tag being generated based upon the encryption key.

37. The receiving node as defined by claim 30 wherein the encryption key is associated with the transmitting node.

38. The receiving node as defined by claim 30 wherein the encryption key is associated with the receiving node.

39. The receiving node as defined by claim 30 wherein the transmitting node is determined to be in the multicast if the ascertained first tag is substantially identical to the first tag.

40. The receiving node as defined by claim 30 wherein the message is generated by an origin node having an origin tag, the receiving node receiving the origin tag, the first tag and second tag being calculated based upon the origin tag.

41. A computer program product for use with a receiving node in a computer network for authenticating a message received from a transmitting node in the computer network, the receiving node being one of a plurality of nodes in a multicast, the computer program product comprising a computer usable medium having computer readable program code thereon, the computer readable program code including:

program code for locating a first tag, the first tag including information indicating if the transmitting node is in the multicast, the first tag being received with the message, the first tag generated by the transmitting node utilizing an encryption key known to the transmitting node;

program code for utilizing the first tag to determine if the transmitting node is in the multicast by calculating an ascertained first tag utilizing the encryption key and comparing the ascertained first tag with the first tag to determine if the transmitting node is in the multicast;

program code for generating a second tag if the transmitting node is determined to be in the multicast; and program code for transmitting the message and generated second tag to a third node in the multicast, the second tag including information indicating that the receiving node is in the multicast.

42. The computer program product as defined by claim 41 wherein the first tag is appended to the message.

43. The computer program product as defined by claim 41 wherein the message includes a plurality of tags associated with a plurality of nodes in the multicast, the plurality of tags being appended to the message.

44. The computer program product as defined by claim 41 wherein the first tag is incorporated into the message.

45. The computer program product as defined by claim 41 wherein the receiving node is a network router.

46. The computer program product as defined by claim 41 wherein the encryption key is associated with the receiving node, the second tag being generated based upon the encryption key.

47. The computer program product as defined by claim 41 wherein the third node has an associated encryption key, the second tag being generated based upon the encryption key.

48. The computer program product as defined by claim 41 wherein the encryption key is associated with the transmitting node.

49. The computer program product as defined by claim 41 wherein the encryption key is associated with the receiving node.

50. The computer program product as defined by claim 41 wherein the transmitting node is determined to be in the multicast if the ascertained first tag is substantially identical to the located first tag.

51. The computer program product as defined by claim 41 wherein the message is generated by an origin node having an origin tag, the receiving node receiving the origin tag, the first tag and second tag being calculated based upon the origin tag.

52. A network device for participating in a multicast across a computer network, the network device comprising:

an input that receives messages and their associated tags from other network devices, each associated tag generated utilizing a respective encryption key known to a respective one of the other network devices;

a tag generator that generates tags;

an authenticator that reads tags associated with each message received from the other network devices, the authenticator determining if each received message is received from a network device in the multicast based upon the tag associated with each received message, each received message deemed to be authenticated if determined to be received from a network device in the multicast by calculating a generated first tag utilizing the respective encryption key and comparing the generated first tag with the received associated tag to determine if the respective one of the other network devices is in the multicast; and an output that transmits an authenticated message and a tag to a given network device, the tag being generated by the tag generator to include information indicating that the network device is in the multicast.

53. The network device as defined by claim 52 wherein received messages without tags are deemed to be not authenticated.

54. The network device as defined by claim 52 wherein the given network device has an associated encryption key, the transmitted tag being generated by the tag generator based upon the associated encryption key.

55. The network device as defined by claim 52 wherein the network device includes a network device encryption key, the tag generator utilizing the network device encryption key to generate the transmitted tag.

56. In a multicast, a method of authenticating a message transmitted from a first node to a second node in a computer network, the method comprising:

controlling the first node to generate a first tag having data indicating if the first node is in the multicast, the first tag generated by the first node utilizing an encryption key known to the first node;

transmitting the message and the first tag to the second node;

utilizing the first tag to determine if the first node is in the multicast by calculating a generated first tag utilizing the encryption key and comparing the generated first tag with the first tag to determine if the first node is in the multicast;

generating a second tag if the first node is determined to be in the multicast; and transmitting the message and the second tag to a third node in the multicast, the second tag including data indicating that the second node is in the multicast.

57. The method as defined by claim 56 wherein the first tag is appended to the message.

58. The method as defined by claim 56 wherein the encryption key is associated with the first node.

59. The method as defined by claim 56 wherein the encryption key is associated with the second node.

60. The method as defined by claim 56 wherein the second node has an associated second encryption key, the second tag being generated based upon the second encryption key.

61. The method as defined by claim 56 wherein the third node has an associated third encryption key, the second tag being generated based upon the third encryption key.

62. In a multicast having a plurality of network devices, a method of filtering a message comprising:

receiving the message and an identification tag from a first network device, the tag having identification data identifying the multicast, the identification tag generated by the first network device utilizing an encryption key known to the first network device;

determining if the first network device is in the multicast based upon the identification tag by calculating a generated identification tag utilizing the encryption key and comparing the generated identification tag with the identification tag to determine if the first network device is in the multicast; and forwarding the message to a second network device in the multicast if the first network device is determined to be in the multicast.

63. The method as defined by claim 62 further comprising:

forwarding a second tag with the message to the second network device if the first network device is determined to be in the multicast, the second tag including data indicating that the message has been forwarded from at least one network device in the multicast.

64. The method as defined in claim 62 wherein the encryption key is associated with the first network device.

* * * * *